(No Model.)
J. M. FENNERTY.
BILGE WATER INDICATOR.
No. 274,474. Patented Mar. 27, 1883.
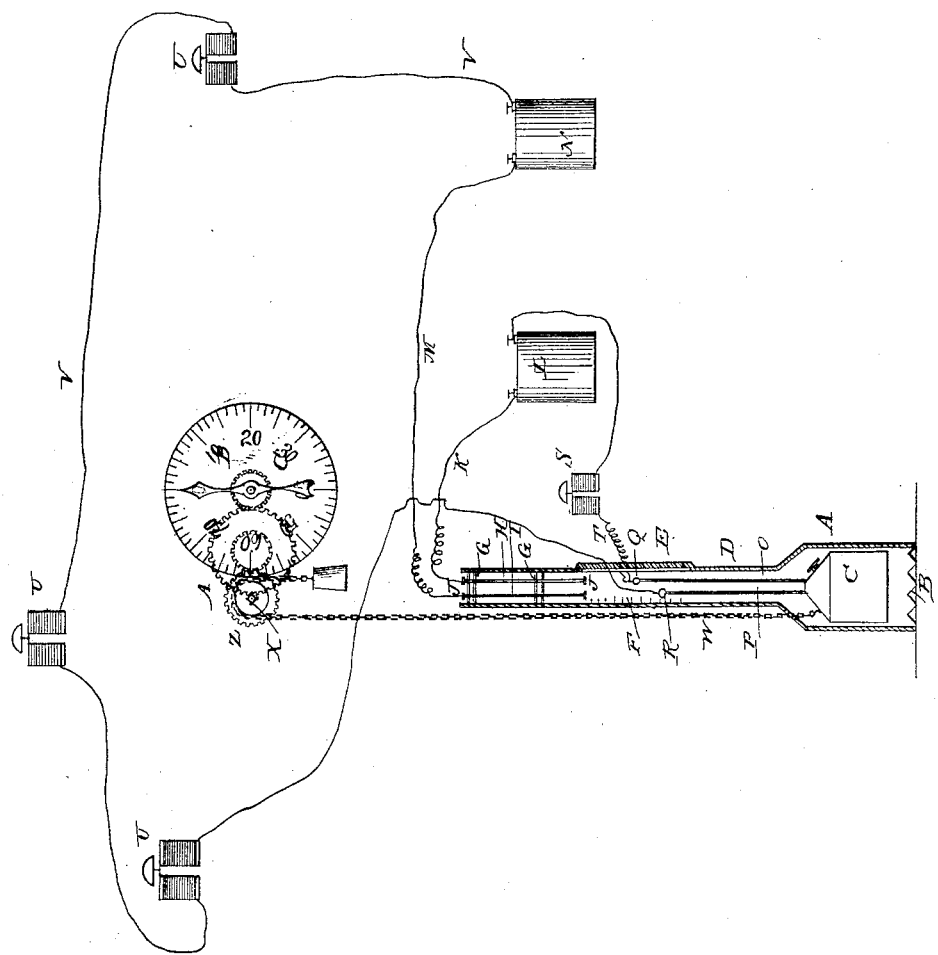
WITNESSES:
INVENTOR.
John M. Fennerty,
by C. A. Snow & Co.
ATTORNEYS.

UNITED STATES PATENT OFFICE.

JOHN M. FENNERTY, OF MEMPHIS, TENNESSEE.

BILGE-WATER INDICATOR.

SPECIFICATION forming part of Letters Patent No. 274,474, dated March 27, 1883.

Application filed June 13, 1882. (No model.)

*To all whom it may concern:*

Be it known that I, JOHN M. FENNERTY, of Memphis, in the county of Shelby and State of Tennessee, have invented certain new and useful Improvements in Automatic Bilge-Water Indicators; and I do hereby declare that the following is a full, clear, and exact description of the invention, which will enable others skilled in the art to which it appertains to make and use the same, reference being had to the accompanying drawing, which forms a part of this specification.

This invention relates to an electric bilge-water alarm, to be sounded automatically when the bilge-water in a vessel reaches a certain height; and it consists in certain improvements in the construction of the same, which will be hereinafter fully described, and particularly pointed out in the claim.

The drawing hereto annexed represents a part sectional elevation of my invention.

A is a cylindrical casing, arranged in the hold of a vessel, (in this case supposed to be a steamboat,) and provided at its lower end with notches B, to admit the bilge-water into said casing, which contains a float, C, consisting of an air-tight metallic vessel. The casing A has at its upper end a tube, D, projecting upward into the engine-room, and having a glass front, E, through which a graduated scale, F, in said tube may be observed. Tube D is provided with insulating-diaphragms G, having bearings for a pair of vertically-sliding metal rods, H I, provided at their upper and lower ends with disks or buttons J. The upper end of the slide H is connected by a wire, K, with one pole of an electric battery, L, and the slide I is likewise connected by a wire, M, with one pole of a battery, N. The float C is provided with rods O P, projecting upward into tube D, and provided at their upper ends with insulated metal points Q R. The rods O P are so arranged that when the float rises to a certain point the point Q of rod O (which is the longest of the two) shall first strike the disk J at the lower end of slide H and lift said slide. Afterward, if the float continues to rise, the point R of rod P will come in contact with the disk J at the lower end of slide I.

S is an electric bell, arranged in the engine-room, and connected by a wire, T, with the point Q of rod O, and with the battery L. Electric bells U are likewise arranged in the captain's room, in the pilot-house, the cabin, and other places where desired on the boat, and placed in the circuit of the battery N by a wire, V, which connects said battery with the point R of rod P. Tube D may be provided with slots to enable the ends of the wires T V, which are coiled loosely, to rise and fall freely.

W is a chain attached to the float C, and passing through an opening in the top of casing A and over a pulley, X, in the captain's room, its end being provided with a balance-weight, Y. Pulley X is on the shaft of a cog-wheel, Z, communicating motion through a train of gear-wheels, A', to the hands B' of an indicator-dial, C'.

The operation of my invention will be readily understood: When the float C rises, the hands B' indicate on dial C' the height of the water in the hold. This may also be observed in the engine-room by observing the position of the points Q R in relation to the scale F. When the point Q strikes the slide H, the circuit of the battery L is made and the alarm S in the engine-room sounded, thus warning the engineer to take precautionary measures. Should he be unable to control the rise of water, and the float continue to rise, the point R will strike the slide I, making the circuit of the battery N and sounding the alarms U, giving timely warning to the captain, pilot, and passengers.

Having thus described my invention, I claim and desire to secure by Letters Patent of the United States—

The combination of the casing A, the tube D, having insulating-diaphragms G, the slides H I, the float C, having rods O P, with insulated points Q R, the batteries L N, alarms S U, and suitable connecting-wires, all arranged substantially as set forth.

In testimony that I claim the foregoing as my own I have hereto affixed my signature in presence of two witnesses.

JOHN M. FENNERTY.

Witnesses:
A. K. HANCOCK,
THOS. FLEMING.